Feb. 7, 1967    G. F. MANGUM    3,302,400
RESTARTABLE IGNITION SYSTEM FOR SOLID PROPELLANT ROCKET MOTORS
Filed April 20, 1964    3 Sheets-Sheet 3

Grafton F. Mangum INVENTOR.

BY

ATTORNEY

United States Patent Office 3,302,400
Patented Feb. 7, 1967

3,302,400
RESTARTABLE IGNITION SYSTEM FOR SOLID
PROPELLANT ROCKET MOTORS
Grafton F. Mangum, Huntsville, Ala., assignor to Thiokol Chemical Corporation, Bristol, Pa., a corporation of Delaware
Filed Apr. 20, 1964, Ser. No. 361,068
2 Claims. (Cl. 60—39.82)

This invention relates to improvements in ignition systems that are to be used in conjunction with solid propellant rocket motors and, more particularly, with those solid propellant rocket motors that have extinguishable and reignitable capabilities.

Rocket motors falling under this category have various types of mechanisms incorporated therewith that extinguish and then permit the reignition of the solid propellant during the flight thereof. Therefore, the instant invention is directed toward an ignition system that will serve to reignite the solid propellant after it has been extinguished.

The rocket motors to which this invention relates are of the conventional type utilizing a combustion chamber which contains a solid propellant and the solid propellant therein being ignited by an igniter postioned at either the aft end or the head end of the combustion chamber. The ignition of the solid propellant causing a generation of a hot gaseous fluid under pressure which provides a propulsive force for the rocket motor.

If the generation of the hot gaseous fluid under pressure is terminated and there still remains a portion of the solid propellant in the rocket motor, reignition of the remaining propellant must be instigated if additional propulsion or acceleration of the rocket motor is found to be necessary while the rocket motor is in flight.

The ignition system involving the instant invention has been designed to be affected by the pressure of the hot gaseous fluid so that, as the combustion of the solid propellant is terminated and the pressure decreases, the ignition system will be readied to restart or reignite the solid propellant upon command.

It is an object of this invention, therefore, to provide an ignition system that is capable of repetitive ignition or reignition of a solid propellant upon command.

It is another object of the invention to provide a ported ignition system that, by the opening and closing of such ports, the capability of the ignition system to ignite or reignite the solid propellant is controlled.

With the above and other objects and advantages in view, the invention consists of the novel details of construction, arrangement, and combination of parts more fully hereinafter described, claimed and illustrated in the accompanying drawings in which:

FIGURE 4 is a longitudinal, sectional view of a rocket motor showing, in elevation, the manner of mounting the ignition system embodying the invention in the rocket motor.

Figure 1:
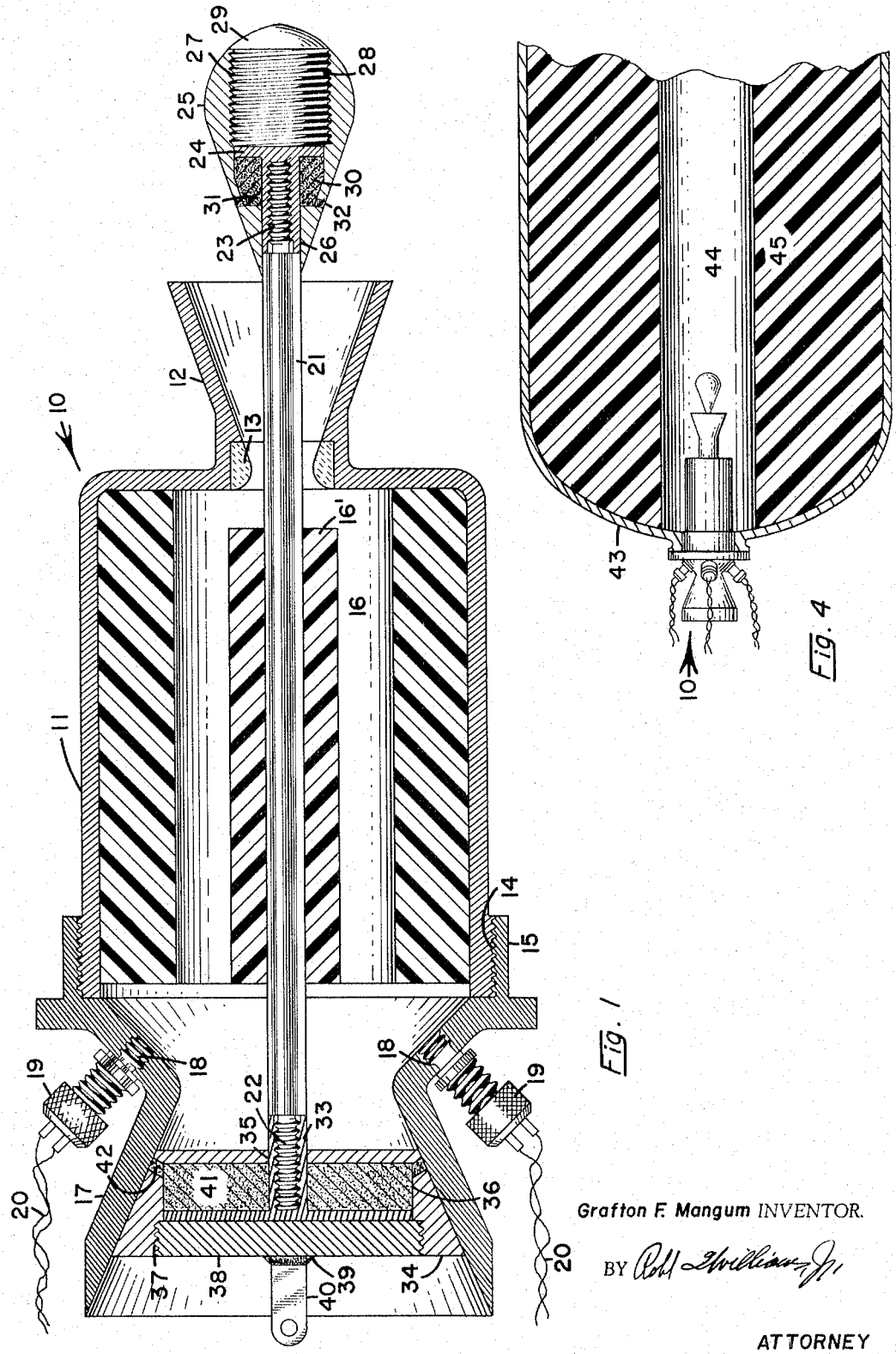
FIGURE 1 is a longitudinal, sectional view of an ignition system embodying the invention in igniting position.
Figure 2:
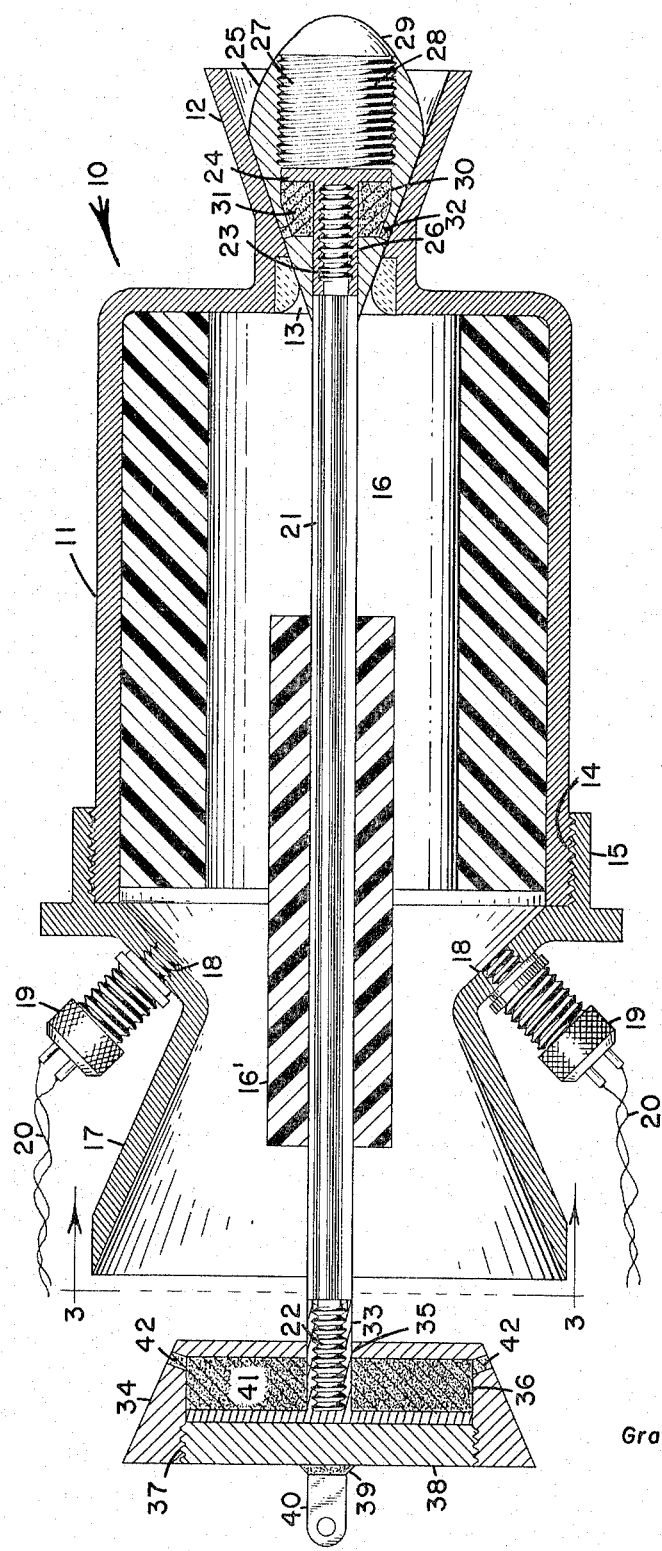
FIGURE 2 is a view, similar to FIGURE 1, with the ignition system in cut-off or non-igniting position.
Figure 3:
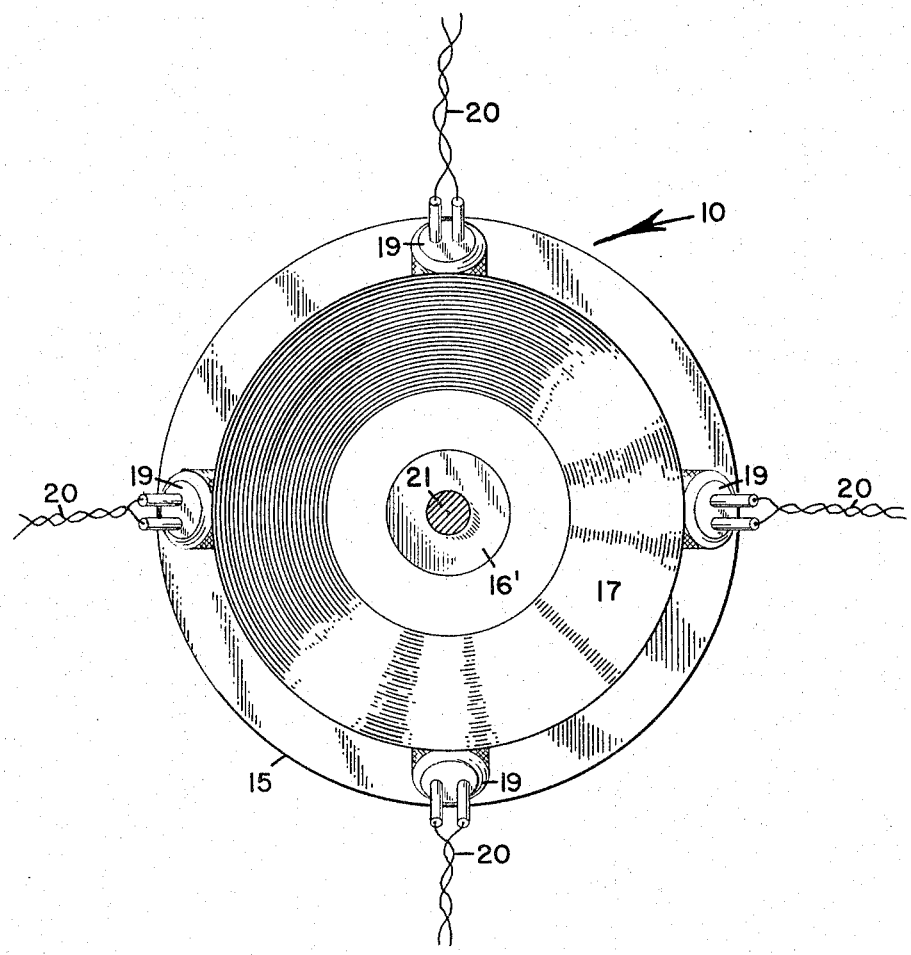
FIGURE 3 is a vertical, sectional view of the aft end of the ignition system taken approximately on the line 3—3 of FIGURE 2.

Referring more in detail to the drawings wherein like parts are designated by like reference numerals, the reference numeral 10 is used to generally designate an ignition system embodying the invention.

The ignition system 10 comprises a tubular metal casing 11 provided at one end with a De Laval nozzle 12 that is provided with a convention throat insert 13. The opposite end of the metal casing 11 is externally threaded, as at 14, to receive the adapter 15; and cast within the metal casing 11 is a tubular body 16 of a pyrotechnic material that may or may not have the same composition as the solid propellant of the rocket motor which is to be ignited.

The adapter 15 includes a port area 17 which is similar in shape to the nozzle 12 but is not equipped with a throat insert. The port area 17 is provided with an annular row of equally-spaced and radially-disposed threaded bores 18 into each of which is threaded an electrical initiator 19 and from each of which the electric leads 20 extend.

Extending longitudinally of the metal casing 11 is a high melting point metal shaft 21, and the opposite ends thereof are threaded, as at 22 and 23. Cast onto the medial portion of the shaft 21 to increase the surface burning area within the ignition system 10 is a cylindrical body 16' of a material which is similar in all respects to the pyrotechnic material from which the body 16 is formed.

Threadably secured to the threaded end 23 of the shaft 21 is a plunger 24 on which is loosely mounted a pear-shaped plug 25. To accommodate the plunger 24, the plug 25 is provided with a smooth bore 26 and an internally-threaded socket 27 which is of a slightly larger diameter than the plunger 24. A screw insert 28 having a head 29 thereon that conforms to the configuration of the plug 25 is removably screwed into the socket 27; and thus the plug 25 may be mounted on the plunger 24. The bore 26 of the plug 25 has communication with a cavity 30 therein, and a highly viscous sealant material 31 is placed in the cavity 30. The plug 25 conforms as nearly as possible to the internal configuration of the nozzle 12; and to further seal the plug 25 in the nozzle 12, the sealant material 31 is permitted to escape from the cavity 30 by means of equally-spaced, radially-disposed outlets 32.

Threadably secured to the threaded end 22 of the shaft 21 is a plunger 33 on which is loosely mounted a substantially frusto-conical shaped plug 34. To accommodate the plunger 33, the plug 34 is provided with a smooth bore 35 and a cavity 36. An internally-threaded socket 37 of slightly larger diameter than the cavity 36 communicates therewith and has a screw disc 38 threadably seated therein. Secured to the central portion of the screw disc 38 by welding 39 or the like is an apertured link 40, the purpose of which will be later described. A sealant material 41, such as zinc chromate putty, is placed in the cavity 36 and, though the plug 34 conforms as nearly as possible to the internal configuration of the port area 17, it is necessary that the sealant material 41 escape from the cavity 36 by means of outlets 42 to further seal the plug 34 within the port area 17.

In order to understand the operation of the ignition system 10, it is pointed out that the ignition wires are connected to a conventional command-operated mechanism that is mounted on the rocket motor, and the link 40 is connected to a conventional command-operated mechanism that is also mounted on the rocket motor. Thus the initiator 19 and shaft 21 can be operated from the ground or by a guidance control mechanism mounted on the rocket motor while the rocket motor is performing its flight pattern.

The configuration of the plugs 25 and 34 and the nozzle 12 and port area 17 depend upon the size and inherent burning characteristics of the solid propellant in the rocket motor with which the ignition system 10 is to be used. The size of the nozzle 15 and port area 17 must be determined before the installation of the ignition system to provide effective ignition, extinguishing and reignition of the solid propellant during the flight of the rocket motor. In other words, the ratio of the size of the nozzle 12 when compared with the size of the port area 17 may be to the magnitude of 10 with the nozzle 12 being the smaller and with the size of the ignition system 10 increasing as the size of the rocket motor increases.

With the ignition system 10 mounted on the head end of a rocket motor 43 and with the nozzle 12 directed toward the central configuration 44 of the solid propellant 45, as shown in FIGURE 4, the ignition system 10 is ready for operation. Upon command, either one of the initiators 19 is electrically energized to provide the thermal energy necessary to ignite the bodies 16 and 16' of the pyrotechnic material, and the resulting hot gases that flow outwardly of the nozzle 12 will ignite the solid propellant 45 in the rocket motor 43 on which the ignition system is mounted. When the solid propellant 45 has been ignited, the shaft 21 is operated by the command mechanism connected thereto. The plug 25 is drawn into the nozzle 12, and the plug 34 is moved outwardly of the port area 17 to vent the casing 11 to the atmosphere. This action will suddenly decrease the pressure in the casing 11 and extinguish the pyrotechnic material from which the bodies 16 and 16' are formed. When it is desired to reignite the solid propellant 45 in the rocket motor 43 after it has been extinguished, the shaft 21 is operated to move the plug 25 outwardly of the nozzle 12. Another of the initiators 19 is energized and the solid propellant 45 is reignited.

The reciprocation of the shaft 21 will operate the ignition system 10 to either extinguish the pyrotechnic material or ready the ignition system 10 for reignition of the solid propellant 45 upon command.

For purposes of illustration, four initiators 19 have been shown; but this number can be increased or decreased depending upon the desired performance of the rocket motor with which the ignition system is associated.

The ignition system 10 is especially adapted for use at the high altitudes that are attained by the rocket motor during the flight thereof; and since the plugs 25 and 34 are properly sealed in the nozzle 12 and port area 17, there is no chance of blow-by and failure of the ignition system 10. The ignition system 10 will operate with conventional types of solid propellants and will serve to reignite the solid propellant in the rocket motor once it has been extinguished. Since the mechanism for extinguishing of the solid propellant does not form a part of the present invention, no explanation thereof has been included since any mechanism that is well-known to those skilled in the art may be used for this purpose.

It is believed, therefore, that the construction and manner of operation of the instant invention will be clear from the foregoing description to those skilled in the art; and it is to be understood that variations in the mode of construction and operation thereof may be carried out providing such variations fall within the spirit of the invention and the scope of the appended claims.

Having thus described the invention, what is claimed as new and desired to be secured by Letters Patent is:

1. An ignition system for a solid propellant rocket motor comprising in combination, a tubular casing having a discharge nozzle at one end thereof and a venting port area at the opposite end thereof, a tubular body of pyrotechnic material located in said casing, igniting means for said body of pyrotechnic material mounted in said casing, a shaft mounted for reciprocation longitudinally of said casing, a first plug on one end of said shaft for closing said nozzle, a second plug on the opposite end of said shaft for closing said port area, each of said plugs having a cavity therein, sealing means positioned in each of said cavities and each of said cavities having escape vents to permit the escape of said sealing means for the sealing of said plugs within said port area and said nozzle.

2. An ignition system for a solid propellant rocket motor comprising in combination, a tubular casing having an integral discharge nozzle at one end thereof and a venting port area at the opposite end thereof, a tubular body of pyrotechnic material located in said casing, an adapter defining said port area detachably connected to said casing, igniting means for said body of pyrotechnic material mounted in said adapter in circumjacent relation to said port area, a shaft mounted for reciprocation longitudinally of said casing, a first plug on one end of said shaft for closing said nozzle, sealing means carried by said first plug to seal the area between said first plug and said nozzle, a second plug on the opposite end of said shaft for closing said port area and sealing means carried by said second plug to seal the area between said second plug and said port area.

References Cited by the Examiner
UNITED STATES PATENTS

| | | | |
|---|---|---|---|
| 2,613,497 | 10/1952 | MacDonald | 60—35.6 |
| 3,166,899 | 1/1965 | Keathley | 60—35.6 |

CARLTON R. CROYLE, *Primary Examiner.*

SAMUEL FEINBERG, *Examiner.*